J. M. TRAVIS.
DISPENSING APPARATUS.
APPLICATION FILED DEC. 3, 1917.
1,287,141.
Patented Dec. 10, 1918.
2 SHEETS—SHEET 1.
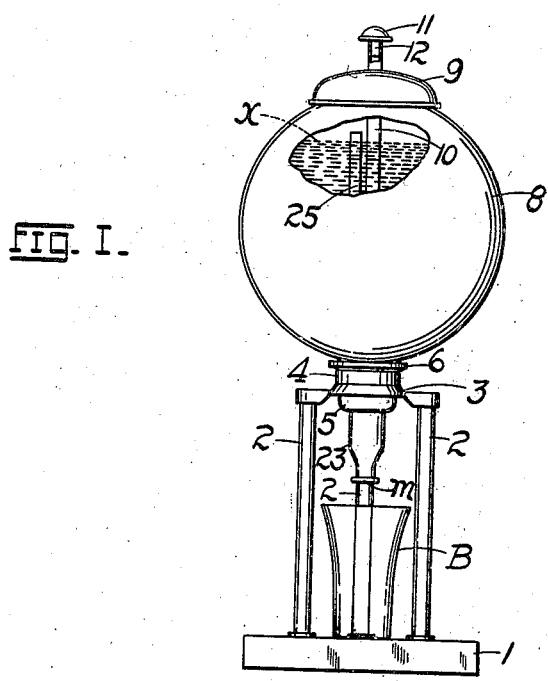
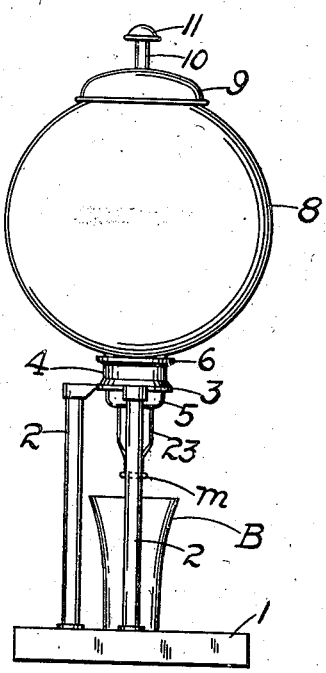
WITNESSES:
INVENTOR.
John M. Travis.
BY Emil Starek
ATTORNEY.

UNITED STATES PATENT OFFICE.

JOHN M. TRAVIS, OF ST. LOUIS, MISSOURI.

DISPENSING APPARATUS.

1,287,141.   Specification of Letters Patent.   Patented Dec. 10, 1918.

Application filed December 3, 1917. Serial No. 205,199.

*To all whom it may concern:*

Be it known that I, JOHN M. TRAVIS, a citizen of the United States, residing at St. Louis, State of Missouri, have invented certain new and useful Improvements in Dispensing Apparatus, of which the following is a full, clear, and exact description, reference being had to the accompanying drawings, forming a part hereof.

The present invention is directed to syrup dispensing apparatus employed in connection with "soda water" fountains, the object of the invention being to provide a dispenser which will at the same time serve as a measuring device, it being desirable that uniform quantities of syrup be dispensed with each glass of soda to be served. A further object is to provide a dispenser which will cause the syrup to be discharged by gravity in a most direct manner, avoiding a circuitous path and insuring the delivery of the last drop of the syrup previously measured out and confined in a suitable collecting basin or cup previous to its release. A further object is to provide a construction which is simple, durable, reliable and positive in action; one which can be mounted so as to present an artistic appearance, and one possessing further and other advantages better apparent from the following detailed description in connection with the accompanying drawings in which—

Figure 3:
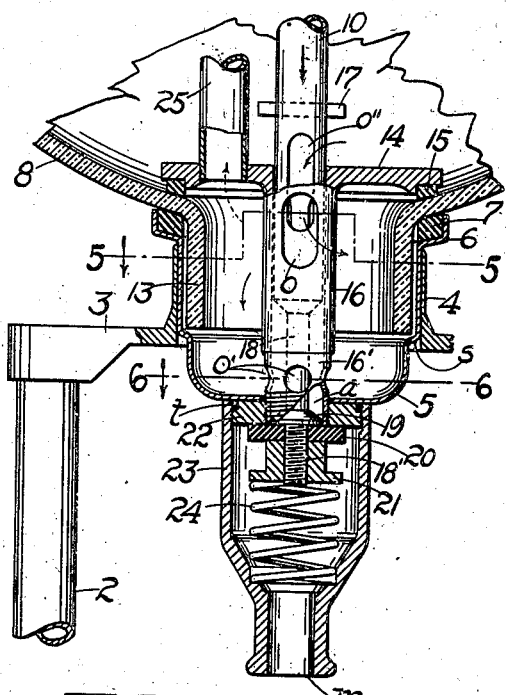
Figure 4:
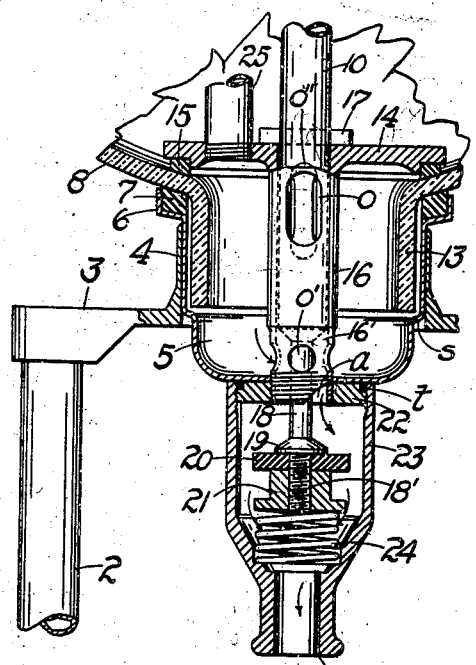
Figure 5:
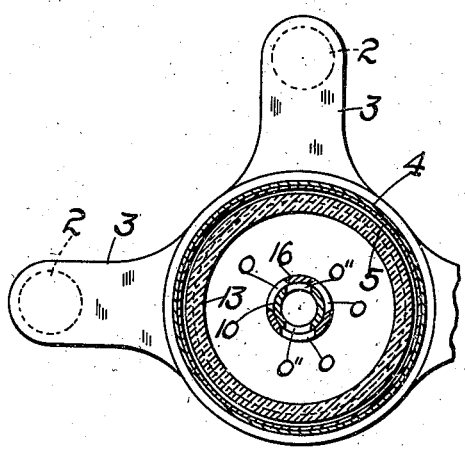
Figure 6:
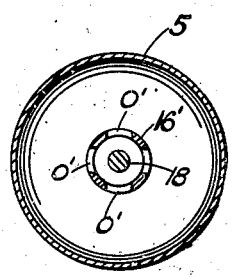

Figure 1 represents a front elevation of my invention, with the walls of the container shown partly broken away; Fig. 2 is a side elevation thereof; Fig. 3 is a middle vertical transverse section through the measuring cup, faucet and container, the upper portion of the latter being broken away, with the plunger in its normal raised position; Fig. 4 is a similar section with plunger depressed for discharging the contents of the measuring cup; Fig. 5 is a horizontal section on the line 5—5 of Fig. 3; and Fig. 6 is a horizontal section on the line 6—6 of Fig. 3.

Referring to the drawings, 1 represents a suitable base or platform from which lead the posts 2, the upper ends whereof are connected by the arms of a spider 3 provided with a central upwardly projecting socket 4 from which the arms of the spider radiate. The parts described form a suitable standard or mounting for my improved dispenser though any other design of mounting may be employed. The socket 4 receives, and serves as a support for the cup 5 which constitutes the measuring or collecting vessel for the syrup (or other liquid to be dispensed), the bottom of the cup being provided with a discharge opening, and the upper edge of the cup terminating in a flange or rim 6 which engages the upper edge of the socket 4 and prevents the cup from dropping through the socket. The peripheral walls of the cup are formed at a convenient point with an inner shoulder or offset *s* as shown, the portion below the shoulder projecting below the spider 3. The rim 6 forms an annular seat for a rubber or equivalent gasket 7, said gasket serving as a seat for the bottom portion of the glass syrup container 8. The container is preferably spherical in form, the upper opening thereof being covered or protected by a cap-piece 9, which is provided with a central opening for the free passage therethrough of the hollow valve-operating plunger 10 which is preferably topped by a rounded head 11 equipped with a stem 12 inserted into the plunger. The discharge end of the container is formed with a hollow neck or nipple 13 which fits in the cup 5, the end of the neck reaching to the shoulder *s* of the cup. Spanning the opening across the base of the neck 13 is a disk 14 preferably provided with a gasket 15 for bearing against the glass walls of the container, the said disk being provided with a centrally disposed hollow depending stem 16 open at both ends, and provided at points adjacent the disk with a plurality of elongated peripheral slots or ports *o* (or their equivalent), the free end of the stem terminating in a reduced screw-threaded portion 16' provided with a corresponding number of peripheral ports or circular openings *o'*. Leading from the disk 14 and operating freely through the disk and through the hollow stem 16 is the aforesaid reciprocating stem or plunger 10 (preferably hollow to have it as light as possible) said plunger extending upwardly through the cap 9 as already stated. The lower portion of the plunger is equipped with diametrically opposite peripheral elongated slots or ports *o''* (or their equivalent) which are in permanent communication with the ports *o* of the stem 16. When the plunger is in its raised position the upper portions of the slots *o''* terminate in the container 8, the lower portions being still in communication with the ports *o* of the stem 16 so that syrup from the container 8 is free to flow through the slots $o''$ and out through the slots or ports $o$ into the measuring cup 5 (Fig. 3).

The plunger 10 is provided with a cross-pin 17 at a point slightly above the upper terminals of the slots $o''$, said cross pin (or its equivalent) limiting the downward or inward movement of the plunger by coming in contact with the disk 14. When the plunger 10 is pushed to its lowest position the upper ends of the slots or ports $o''$ are depressed below the upper surface of the disk so they are no longer in communication with the interior of the container, and consequently the flow of the syrup from the container into the cup 5 is cut off (Fig. 4).

At a point below the slots or ports $o$ of the stem 16, the plunger 10 terminates in a reduced valve-stem 18 whereby an annular space $a$ is left between said valve-stem and the inner walls of the hollow stem 16 for the flow of the syrup entering the ports $o'$. The flow of the liquid from the space $a$ is cut off by the valve 19 carried by the valve-stem, said valve closing the lower open end of the hollow stem 16 when the plunger 10 assumes its highest or elevated position. The valve-stem 18 terminates in a screw-threaded extension $18'$ beyond the valve 19 said threaded portion receiving a gasket 20 to engage the end of the stem 16, and a tightening or jam nut 21 for holding the gasket in firm contact with the valve. Adapted to be passed over the threaded terminal of the hollow stem 16 is a screw ring 22 which when driven home bears against the bottom of the measuring cup or collecting vessel 5, this arrangement serving to draw the gasket 15 of the disk 14 firmly to its seat. The ring 22 is exteriorly threaded, and over the threaded portion is passed the discharge nozzle or spout 23 preferably provided with a reduced discharge mouth $m$ as shown, the said nozzle confining a spiral expansion spring 24 one end of which rests at the base of the mouth $m$, the opposite end bearing against the nut 21 and normally holding the plunger 10 in its raised position. Leading from the disk 14 and in free communication therethrough with the cup 5 is a vent tube 25 whose upper end projects above the highest level $x$ of the liquid (syrup) in the container.

The operation is obvious from the description, and briefly stated is as follows: Normally, the spring 24 holds the plunger 10 in its raised position, thus bringing the upper ends of the ports $o''$ into communication with the interior of the container. In this position the valve 19 closes the lower end of the threaded portion $16'$ of the hollow stem 16, thus preventing the escape of the liquid from the annular space $a$ into the spout 23. As seen from the drawings (Figs. 3, 4,) the portion of the member $16'$ below the ports $o'$ passes through the bottom opening of the cup and projects sufficiently beyond the bottom of the cup to permit the attaching thereto of the screw-ring 22 which, engaging as it does the bottom of the cup, makes a tight joint therewith and prevents leakage around the member $16'$. In practice a gasket $t$ is interposed between the ring 22 and cup 5. With the plunger 10 in its raised position, the syrup in the container is free to flow therefrom through the upper portions of the ports $o''$ into the bore of the hollow plunger (and where the plunger was a solid bar the same would be formed with a transverse slot through the bar which would be a full equivalent) thence through the lower portions of the ports $o''$ and through the ports $o$ (below the disk 14) into the cup 5, no flow from the cup being possible because the ports $o'$ are above the bottom of the cup, and the lower end of the member $16'$ is closed by the valve 19, and gasket 20. The cup 5 is thus filled, its contents furnishing the proper quantity of syrup for each tumbler full of soda served. To release the contents of the cup into the tumbler B the latter is placed under the mouth $m$ of the spout 23, whereupon the clerk depresses the plunger 10 until the pins 17 arrest the same by coming in contact with the disk 14. This operation forces the ports $o''$ wholly below the upper surface of the disk 14 thereby cutting off the flow of syrup from the container 8 into the measuring cup (or equivalent collecting vessel), and serves to depress the valve 19 so as to open the passage $a$ and allow the contents of the cup to flow through the ports $o'$ into and through the passage $a$ and into the spout 23 and out through the mouth $m$ into the tumbler B. In this operation the spring 24 is naturally compressed, sufficient space however being left between the coils thereof to allow for a free flow of the syrup out of the spout. When the contents of the cup has been drained, the clerk releases the plunger 10, whereupon the spring 24 raises it to normal position reëstablishing communication between the container 8 and cup 5, and cutting off communication between the cup and the discharge spout 23. Thus with each downward movement of the plunger we drain the measuring cup, and with each upward movement we fill the cup from the container, communication between the cup and container being open when that between the cup and discharge spout is cut off, and communication between the cup and discharge spout being open when that between the cup and container is cut off.

It will be observed that the several members 8, 5, and 23 are disposed about a common vertical axis, the spout 23 forming the bottom member of the series, and the liquid from the container reaching it by the shortest and most direct route. There is thus insured a positive gravity discharge of the syrup and the draining of the last drop of syrup released from the measuring cup 5. I do not of course wish to be restricted to the details here shown as they may in a measure be departed from without in any wise affecting the nature or spirit of my invention. It may be stated in passing that as constructed the valve 19 without the gasket 20 is not depended on to close the discharge end of the hollow stem 16, said valve being freely receivable by the bore of the threaded portion 16' thereof. For practical purposes therefore the members 19 and 20 may be considered as the valve, the member 20 being depended on to make a tight joint around the valve 19 by its firm engagement with the end of the hollow stem through which the liquid must flow to enter the spout 23. The gasket 20 by the way limits the upward movement of the plunger (under the action of the spring 24) by virtue of its arrest by the threaded portion of the stem 16, with which as above pointed out, it makes a liquid-tight joint.

Having described my invention what I claim is:

1. A liquid dispensing apparatus comprising a collecting vessel having an opening in the bottom thereof, a container coupled to said vessel and provided with a bottom opening opposite said vessel, a disk spanning said opening and engaging the inner walls of the container, a hollow stem depending from the disk and leading to the opening in the bottom of the collecting vessel, said stem being ported at points adjacent the disk and at points above and adjacent the bottom of the collecting vessel, a plunger operating through the disk and hollow stem thereof and through the container and projecting above the container, said plunger being ported to maintain a permanent communication between the interior thereof and the collecting vessel, and operating to periodically establish communication between the container and collecting vessel, means for limiting the movement of the plunger in a downward direction, a valve-stem on the plunger traversing the hollow stem leading from the disk and spaced from the walls of the hollow stem, a valve on the valve-stem positioned to close the discharge end of the annular space between the valve-stem and hollow stem leading from the disk, and a spring for normally maintaining the valve in seated position.

2. A liquid dispensing apparatus comprising a collecting vessel having an opening in the bottom thereof, a container having a discharge neck inserted in said vessel, a disk spanning the opening at the base of the neck and engaging the inner walls of the container, a hollow stem depending from the disk and projecting through the opening in the bottom of the collecting vessel, said stem having enlongated peripheral ports adjacent the disk, and peripheral ports adjacent and above the bottom of the collecting vessel, a discharge spout coupled to the lower terminal of the hollow stem below the bottom of the collecting vessel, a plunger operating through the disk and hollow stem thereof and through the container and projecting a suitable distance above the container, said plunger being provided with elongated ports communicating permanently with the corresponding ports of the hollow stem aforesaid and operating to establish and cut off communication between the container and collecting vessel, depending on the position of the plunger, means on the plunger for limiting the movement thereof in a downward direction, a reduced valve-stem on the plunger operating in the hollow stem of the disk and forming an annular space with the inner walls of the stem for the flow of the liquid, a valve on the valve-stem positioned to close the discharge end of said annular space for a normal or raised position of the plunger, and thereby cut off communication between the spout and collecting vessel, and an expansion spring in the spout engaging the valve-stem and operating to force said stem and plunger to the normal or raised position aforesaid, and a vent tube leading from the disk in the container and extending above the level of the liquid in the container, said tube establishing communication between the collecting vessel and the atmosphere, the parts operating substantially as, and for the purpose set forth.

In testimony whereof I affix my signature, in presence of two witnesses.

JOHN M. TRAVIS.

Witnesses:
 EMIL STAREK,
 ELSE M. SIEGEL.